Aug. 23, 1932.                R. H. MUELLER ET AL                 1,872,787
                                    FAUCET
                              Filed Jan. 17, 1931
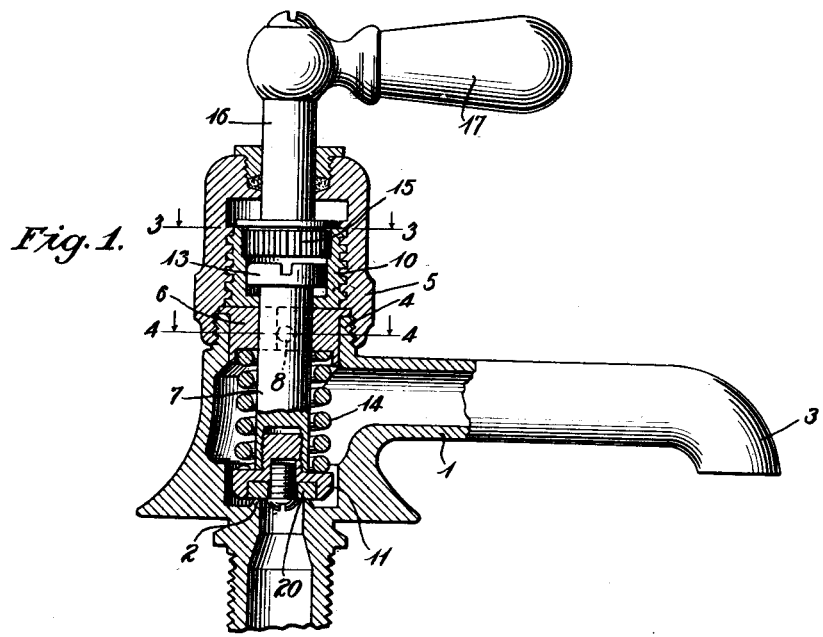
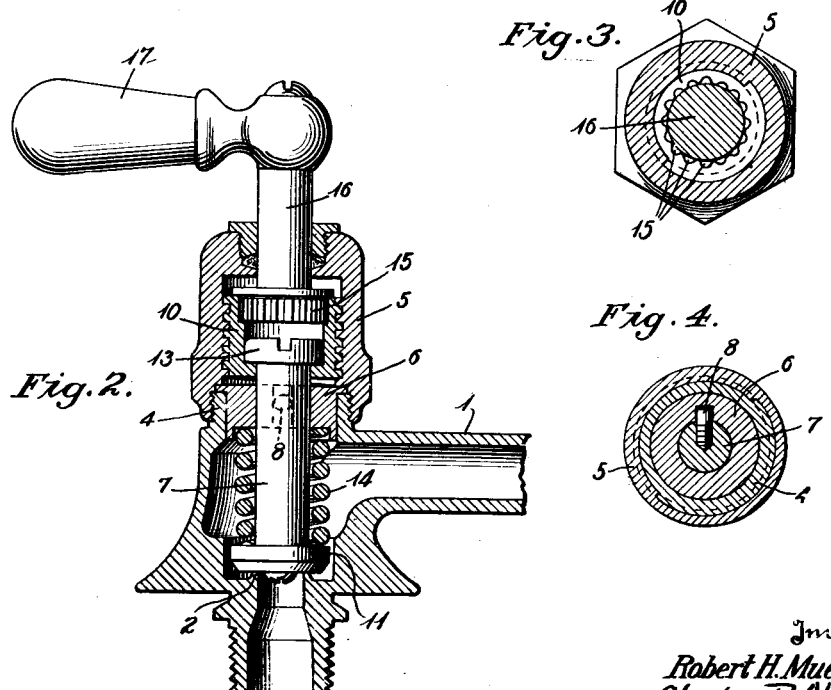
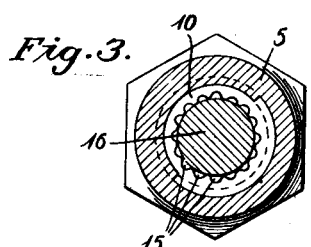
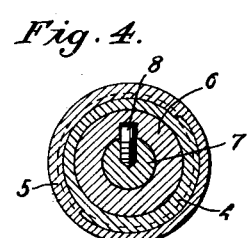
Inventors
Robert H. Mueller
Chester B. Albert Patented Aug. 23, 1932

1,872,787

UNITED STATES PATENT OFFICE

ROBERT H. MUELLER AND CHESTER B. ALBERT, OF DECATUR, ILLINOIS, ASSIGNORS TO MUELLER CO., OF DECATUR, ILLINOIS, A CORPORATION OF ILLINOIS

FAUCET

Application filed January 17, 1931. Serial No. 509,501.

The present invention relates to improvements in faucets, and has for its objects to provide a faucet in which the valve washer is subjected to a minimum amount of wear when in use, and also to avoid the possibility of the valve not being properly and completely seated when the controlling handle is actuated to permit the valve to move to closed position.

One of the objections to the type of faucet commonly employed is that when the valve is not completely seated, the particles of sand or gritty material commonly found in water, in passing between the valve seat and valve seriously damage the washer, so that after a relatively short period of use it becomes so worn as to make it impossible to adjust the valve to completely shut off the flow of water through the faucet.

By the present invention we have provided a simple and durable structure in which the possibility of the valve being left partly open is greatly reduced, and one in which all of the movable parts may be readily removed from the faucet body and replaced, if necessary.

In the accompanying drawing:

Figure 1 is a view partly in vertical section of a faucet provided with an embodiment of the present invention.

Figure 2 is a similar view showing the valve lifting means in a slightly different position.

Figures 3 and 4 are sectional views substantially on the lines 3—3 and 4—4 of Figure 1, respectively.

Referring to the drawing, in the several views of which corresponding parts are designated by like reference characters, 1 designates the body of a faucet having an inlet through its base surrounded by a valve seat 2 and a suitable spout 3.

In the body of the faucet above and directly opposite the valve seat 2, is formed an opening which is surrounded by an annular exteriorly threaded wall 4, that projects upward from the faucet body.

The aperture or opening referred to in the top wall of the faucet body is closed by a suitable bonnet 5, which is engaged with the aforesaid threaded portion 4 of the body. A valve stem guiding sleeve 6 is clamped by the bonnet against the outer end of the threaded portion 4 of the faucet body, said sleeve, as shown, having an annular flange at its outer end.

The stem 7 of the valve extends outward through the sleeve 6, and means are provided whereby relative rotation between said valve stem and guide sleeve are positively prevented. As shown, said means include a screw stud 8 projecting radially from the valve stem and extending into a vertical groove formed in the inner face of the guide.

The bonnet 5 is interiorly provided with a suitable compression thread with which engages a corresponding thread on a valve actuating sleeve 10. As shown, the valve stem 7 is detachably connected to the valve body 11 and at its outer end is provided with head 13 that is adapted to move in the direction of the length of the stem within the chamber formed in the body of the sleeve 10. A coiled spring 14 surrounds the valve stem between the lower surface of the guide sleeve 6, and the valve body 11, said spring being of sufficient strength to normally hold said valve body in close contact with the valve seat 2.

The sleeve 10 is interiorly provided adjacent its outer end with a series of parallel vertical grooves which are adapted to receive corresponding ribs 15, provided at the lower end of the stem 16 of a valve actuating handle 17. The stem 16 extends through a suitable stuffing box provided at the outer end of the bonnet 5.

It will be seen that the chamber formed in the valve actuating sleeve 10 between the lower end of the stem 16 and the bottom of said sleeve permits the valve and stem to move bodily vertically relative to the sleeve and body of the faucet, so that the spring 14 can effectively hold the valve against its seat 2 and such closing of the valve is not dependent on pressure exerted on the actuating handle 17.

As shown, the lower face of the valve body is provided with a removable washer 20.

When the parts are in the relation shown, the valve is held by pressure of the spring 14 in close contact with its seat, and the flow of water through the faucet completely cut off. As shown in Figure 1, there may be slight relative vertical movement between the sleeve 10 and the valve stem without affecting the relation of the valve body to its seat. When the actuating handle 17 is turned from the position shown in Figure 1, to that shown in Figure 2, the sleeve 10 will be moved upward or outward until the interiorly disposed, annular shoulder at the lower end thereof abuts the head at the outer end of the valve stem. Such movement, however, will not move the valve body from its seat. If the valve actuated sleeve is moved farther outward by turning the stem 16, the valve stem 7 will be correspondingly moved outward, compressing the spring 14 and moving the valve body from its seat 2. To close the valve it is only necessary to return the sleeve 10 to the position shown in Figure 1, and the valve will be seated solely by action of the spring 14.

In assembling the several parts of the improvements, the valve stem 7 with the body 11 detached therefrom, is passed through the sleeve 10 and within the latter is positioned the actuating handle stem 16, so that the ribs 15 thereof interlock with the grooves in the sleeve, and said stem is passed outward through the aperture in the outer end of the bonnet, the sleeve 10 being engaged with the compression thread in the latter. The guide sleeve 6 and the spring 14 are then positioned on the valve stem and the valve body 11 screwed into the end of the stem.

Thereafter the bonnet 5 can be readily attached to the threaded portion of the faucet body, and the actuating handle 17 properly connected to its stem 16.

An important feature of the invention is that the valve is held closed by the action of the spring 14, there being a sufficient amount of lost motion provided between the actuating sleeve 10 and the head of the valve stem to permit the spring to hold the valve closed independently of direct pressure from the sleeve 10. The sleeve 10 does not constitute the means for holding the guide sleeve 6 in position, but the latter is clamped between the body of the faucet and the bonnet 5.

It is believed that the operation and advantages of the invention will be readily appreciated from the foregoing description and the drawing.

We claim:

1. In a faucet, the combination of a body having an internal valve seat and an opening in a wall opposite said seat, an interiorly threaded bonnet closing said opening in the body, a guide sleeve extending into said opening in the faucet body and clamped to the body by the bonnet, a valve adapted to cooperate with the seat in the body and having its stem extending outward through said sleeve, means preventing relative rotation between the sleeve and valve stem, a spring acting to hold the valve to its seat, and means cooperating with the internal thread in the bonnet for moving the valve stem and valve outward in the direction of the length of the stem in opposition to spring.

2. In a faucet, the combination of a body having an internal valve seat and an opening in a wall opposite said seat, an interiorly threaded bonnet closing said opening in the body, a guide sleeve extending into said opening in the faucet body and clamped to the body by the bonnet, a valve adapted to cooperate with the seat in the body and having its stem extending outward through said sleeve, means preventing relative rotation between the sleeve and valve stem, a spring surrounding the valve stem between the valve thereon and the inner end of said sleeve and acting to hold the valve to its seat, and means cooperating with the interior thread of the bonnet and extending through the bonnet for moving the valve from its seat against the action of the spring.

3. In a faucet, the combination of a body having an internal valve seat and an opening in a wall opposite said seat, an interiorly threaded bonnet closing said opening in the body, a valve adapted to cooperate with the seat in the body and having its stem extending outward through said opening into the bonnet, a sleeve engaging the thread in the bonnet and surrounding the valve stem so that there may be relative movement between said sleeve and stem in the direction of the length of the stem, means for guiding said stem, and said sleeve having a plurality of parallel, longitudinal, grooves at the outer end thereof, a spring acting to hold the valve against the seat, means for effecting engagement between the sleeve and stem to move the valve from the seat when the sleeve is rotated to move outward in the bonnet a definite distance, and a sleeve rotating spindle extending through the outer end of the bonnet and having its inner end provided with a series of ribs that extend into the grooves at the outer end of said sleeve.

4. In a faucet, the combination of a body having an internal valve seat and an opening in a wall opposite said seat, an interiorly threaded bonnet closing said opening in the body, a guide sleeve extending into said opening in the faucet body and secured against rotation therein, a valve adapted to cooperate with the seat in the body and having its stem extending outward through said sleeve, means preventing relative rotation between the sleeve and valve stem, a spring acting to hold the valve on its seat, an exteriorly threaded valve actuating sleeve disposed within said bonnet in cooperative relation to said internal threads therein, said threaded sleeve having means to engage a portion of said valve stem to move the same axially against the action of said spring, and means extending outside of said bonnet for rotating said valve actuating sleeve.

5. In a faucet, the combination of a body having an internal valve seat and an opening in a wall opposite said seat, an interiorly threaded bonnet closing the opening in the body, a guide sleeve extending into said opening in the faucet body and secured against rotation therein, a valve adapted to cooperate with the seat in the body and having a headed stem extending outwardly through said sleeve, means preventing relative rotation between the sleeve and valve stem, a spring acting to hold the valve to its seat, an exteriorly threaded valve actuating sleeve disposed in said bonnet in cooperative relation to said internal threads therein, said threaded sleeve having an annular interiorly disposed shoulder engageable with the head on said stem to move the stem and valve axially against the action of said spring, and means extending outside of said bonnet for rotating said valve actuating sleeve.

6. In a faucet, the combination of a body having an internal valve seat and an opening in a wall opposite said seat, an interiorly threaded bonnet closing the opening in the body, a guide sleeve extending into said opening in the faucet body and secured against rotation therein, a valve adapted to cooperate with the seat in the body and having a headed stem extending outwardly through said sleeve, means preventing relative rotation between the sleeve and valve stem, a spring acting to hold the valve to its seat, an exteriorly threaded valve actuating sleeve disposed in said bonnet in cooperative relation to said internal threads therein, said threaded sleeve having an annular interiorly disposed shoulder engageable with the head on said stem to move the stem and valve axially against the action of said spring, and a sleeve rotating spindle extending through the outer end of the bonnet and having its inner end provided with a series of ribs that extend into complemental grooves disposed on the inner periphery of said sleeve at the outer end thereof.

In testimony whereof we affix our signatures.

ROBERT H. MUELLER.
CHESTER B. ALBERT.